(No Model.)

D. McNIVEN.
BUFFING OR POLISHING WHEEL.

No. 577,111. Patented Feb. 16, 1897.

WITNESSES:
H. P. Guillo.
John R. Snow.

INVENTOR
Douglass McNiven
BY
Maynadier & Mitchell
ATTORNEYS.

THE NORRIS PETERS CO., PHOTO-LITHO., WASHINGTON, D. C.

UNITED STATES PATENT OFFICE.

DOUGLAS McNIVEN, OF PAWTUCKET, RHODE ISLAND, ASSIGNOR TO THE CAMPBELL MACHINE COMPANY, OF SAME PLACE.

BUFFING OR POLISHING WHEEL.

SPECIFICATION forming part of Letters Patent No. 577,111, dated February 16, 1897.

Application filed July 6, 1896. Serial No. 598,114. (No model.)

*To all whom it may concern:*

Be it known that I, DOUGLAS MCNIVEN, of Pawtucket, in the county of Providence and State of Rhode Island, have invented an Improved Buffing and Polishing Wheel, of which the following is a specification, reference being had to the accompanying drawings, in which—

Figure 1:
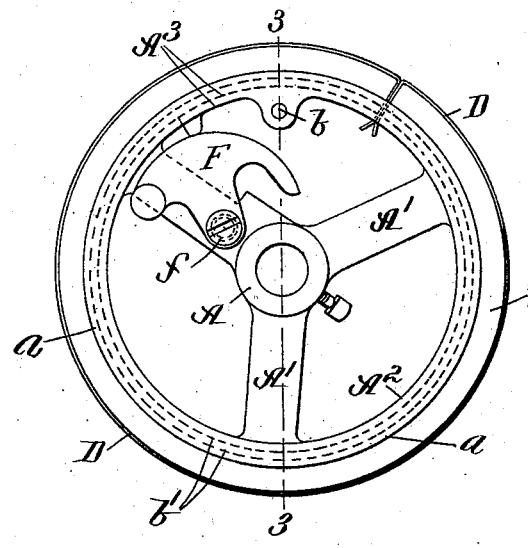
Figure 3:
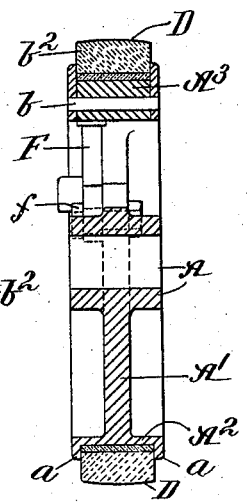
Figure 2:
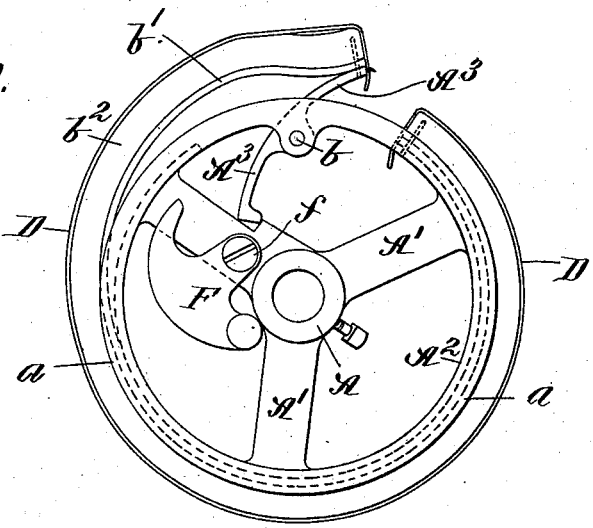
Figure 4:
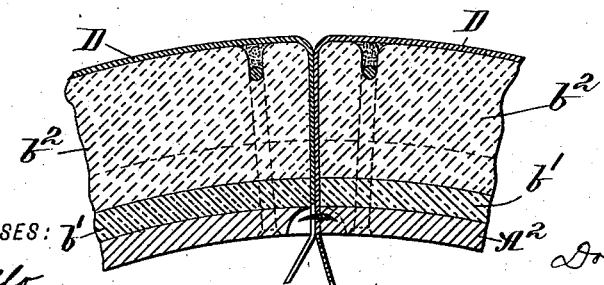

Figure 1 is an elevation of my wheel ready for operation. Fig. 2 is an elevation with the cushion opened in order that the abrasive cover for buffing or the non-abrasive cover for polishing may be removed and a fresh cover substituted. Fig. 3 is a section on line 3 3 of Fig. 1. Fig. 4 is a sectional detail, on a larger scale, showing the preferred means for securing the ends of the cover.

Numerous devices for holding the cover on a buffing or polishing wheel so that it may be readily reversed and replaced are known, but in all wheels of this class known to me the result is obtained by using a wheel in two parts, one of which is hinged or otherwise movably secured to the other, as clearly shown in the patent to Warren, No. 462,888, dated November 10, 1891; but a wheel in two parts is not well adapted to stand the strain to which a wheel of this class is necessarily subjected on account of the very high speed at which it is run, and my invention is a buffing or polishing wheel in which the rim of the wheel is made wider than the cushion, and a portion of the rim corresponding in width to the width of the cushion is movably secured to the rim, one end of the movable portion being secured to one end of the cushion, as more fully explained below.

In the drawings I have shown the wheel composed of hub A, spokes A', and rim $A^2$, preferably provided with flanges $a$, between which the cushion is held. A portion $A^3$ of the rim equal in width to the width of the cushion is mounted on a pin or otherwise movably secured in the rim, so that it may be lifted, as shown in Fig. 2, after its lock F is unlocked, and one end of the cushion, composed of the leather strap $b'$ and felt $b^2$, is connected to one end of the movable portion $A^3$, so that when the portion $A^3$ of the rim is unlocked and raised, as in Fig. 2, one end of the cover D may be bent about the fixed end of the cushion and the other end about the raised end of the cushion, while the cover is stretched about the periphery of the cushion. The portion $A^3$ of the rim is then moved back to place and locked, thus securing both ends of the cover D to the cushion. (See Fig. 4.)

It will be readily seen that my wheel has all the advantages of a wheel made with its rim in two segments, yet my wheel has practically a continuous rim and is therefore adapted to stand a strain much better than any wheel of this class now known.

The lock is shown as a cam F, connected to one of the spokes by the pin $f$, and the movable portion $A^3$ of the rim is shown as a lever, so that when the cam F is moved out of the way the portion $A^3$ may be tilted on pin $b$ as a fulcrum, as in Fig. 2, but when cover F is moved back, as in Fig. 1, the portion $A^3$ is securely locked; but the movable portion $A^3$ of the rim may be otherwise secured to the wheel, and the lock may engage a staple or hasp on the movable portion $A^3$ to hold it down in its place as a portion of the rim of the wheel.

What I claim as my invention is—

In a buffing or polishing wheel a cushion whose width is less than the width of the rim of the wheel; a portion of the rim corresponding in width to the width of the cushion, movable on the wheel, and with one end of the cushion secured to it; and locking devices to lock the narrow movable portion of the rim in place; all substantially as described.

DOUGLAS McNIVEN.

Witnesses:
   B. M. OCHTMAN,
   VICTOR OGILVIE.